United States Patent (10) Patent No.: US 8,343,006 B2
Yang et al. (45) Date of Patent: Jan. 1, 2013

(54) TRANSMISSION

(75) Inventors: Jiafeng Yang, Anhui (CN); Bill Lakis, Anhui (CN); Andrew Nowacki, Anhui (CN); Sarah Wykes, Anhui (CN); Chris Reis, Anhui (CN); John Stokes, Anhui (CN); Frank Bauer, Anhui (CN); Jian Lin, Anhui (CN)

(73) Assignee: Chery Automobile Co., Ltd., Wuhu, Anhui (CN)

( * ) Notice: Subject to any disclaimer, the term of this patent is extended or adjusted under 35 U.S.C. 154(b) by 173 days.

(21) Appl. No.: 12/744,459

(22) PCT Filed: Dec. 4, 2008

(86) PCT No.: PCT/CN2008/073328
§ 371 (c)(1),
(2), (4) Date: Oct. 29, 2010

(87) PCT Pub. No.: WO2009/092215
PCT Pub. Date: Jul. 30, 2009

(65) Prior Publication Data
US 2011/0034293 A1 Feb. 10, 2011

(30) Foreign Application Priority Data
Dec. 29, 2007 (CN) .......................... 2007 1 0306028

(51) Int. Cl.
*F16H 3/44* (2006.01)
(52) U.S. Cl. ....................................... 475/285; 475/275
(58) Field of Classification Search .................. 475/284, 475/285, 275
See application file for complete search history.

(56) References Cited

U.S. PATENT DOCUMENTS 6,120,410 A 9/2000 Taniguchi et al.
(Continued)

FOREIGN PATENT DOCUMENTS
CN 1661262 A 8/2005
(Continued)

OTHER PUBLICATIONS

Supplementary European Search Report, May 11, 2011, pp. 7.
(Continued)

*Primary Examiner* — David D Le
*Assistant Examiner* — Derek D Knight
(74) *Attorney, Agent, or Firm* — Kilpatrick Townsend & Stockton LLP

(57) ABSTRACT

A transmission includes an input shaft (IP), an output shaft (OP), a single planetary gearset (SP), a compound planetary gearset (CP), shifting elements. The single planetary gearset is arranged before the compound planetary gearset, and the shifting elements comprise at least two brakes (B1,B2), the first clutch (C1), the second clutch (C2), the third clutch (C3), and all the shifting elements are positioned between the single planetary gearset and the compound planetary gearset, which has compact arrangements, and can reduce the power transmission length. The transmission also includes an one-way clutch (OWC) acted on the compound planetary gearset. When the transmission shifts to the first speed stage, the first clutch (C1) and the one-way clutch are operated, and the power is transferred from the input shaft to the output shaft via the single planetary gearset and the compound planetary gearset, and when the first speed stage is shifted to the second speed stage, only the first brake (B1) should be operated to engage, thereby it can reduce the frequency of operating the shifting elements and the shifting time in low speed stage.

3 Claims, 2 Drawing Sheets

U.S. PATENT DOCUMENTS

| | | | |
|---|---|---|---|
| 6,634,980 B1 * | 10/2003 | Ziemer | 475/275 |
| 7,125,360 B2 | 10/2006 | Ziemer | |
| 2003/0083174 A1 * | 5/2003 | Tabata et al. | 475/323 |
| 2005/0137044 A1 | 6/2005 | Knowles et al. | |
| 2005/0202927 A1 | 9/2005 | Ziemer et al. | |
| 2006/0025276 A1 | 2/2006 | Shim | |

FOREIGN PATENT DOCUMENTS

| | | |
|---|---|---|
| CN | 1971088 A | 5/2007 |
| DE | 102004038286 A1 | 2/2006 |
| EP | 0434525 A1 | 6/1991 |
| JP | 2000-136854 A | 5/2000 |
| JP | 2000-186751 A | 7/2000 |
| JP | 2000266137 A | 9/2000 |

OTHER PUBLICATIONS

International Search Report for PCT/CN08/073328 mailed Mar. 19, 2009.

* cited by examiner

TRANSMISSION

CROSS-REFERENCES TO RELATED APPLICATIONS

The present application claims priority to PCT/CN2008/073328 filed Dec. 4, 2008 which claims priority from CN Patent Application No. 200710306028.8, titled "Transmission" filed on Dec. 29, 2007 with State Intellectual Property Office of PRC, the disclosure of which is incorporated herein by reference in its entirety.

FIELD OF THE INVENTION

The invention relates to a power transmitting device, in particular, to a transmission for use in a vehicle which can transmit a rotary motion in a manner of changing gear ratio automatically.

BACKGROUND OF THE INVENTION

In the field of vehicle automatic transmission, it is required that the vehicle transmission has a plurality of gears, high transmit power efficiently and compact structure, so that the vehicle has many advantages such as low fuel consumption and excellent driving performance, etc. Therefore, all the current vehicle automatic transmissions contain planetary gear sets and multiple-pieces friction type gear-shifting members such as clutches and brakes in order to increase the number of gears and to improve the efficiency of power-transmitting.

At present, various vehicle automatic transmissions in the market that have six forward gears and a reverse gear each has a single-row planetary gearset, a compound planetary gearset, three clutches and two brakes. The single-row planetary gearset is arranged in front of the compound planetary gearset. Two of the three clutches and the two brakes will be disposed between the two planetary gearsets. The other one of the three clutches will be disposed in front of the single-row planetary gearset. Alternatively, a friction component of the other clutch is disposed at the outer side of single-row type planetary gear and an actuating component is arranged in front of the single-row planetary gearset. Such an arrangement has been discussed in patent publications U.S. Pat. Nos. 7,125,360, 6,120,410 and EP0434525A1, etc. The main defect of such an arrangement is that structure in front of the compound planetary gearset is complicated and not compact enough since a gear-shifting member is provided in front or at the outer side of the single-row planetary gearset. In addition, the length of power-transmitting route is increased, and this has an influence on power-transmitting efficiency and thus on fuel consumption of vehicle.

Furthermore, no one-way clutch has been used in either the vehicle automatic transmission described in U.S. Pat. No. 7,125,360 or that described in EP0434525A1, thus the frequency of use of gear-shifting member for low speed gear is increased and the time for responding to a shift of a low speed gear becomes relatively longer, thereby the driving performance of vehicle is affected.

SUMMARY OF THE INVENTION

The technical problem to be addressed by the invention is to, in view of the above defects, provides a transmission in which the structure is compact and the route of power-transmitting is shortened.

A further object of the invention is to provide a transmission which is able to reduce the frequency of use of gear-shifting member for low speed gear, and shorten the time for responding to an automatic gear shifting and make the control simple.

The transmission provided by the invention comprises a power input shaft, a power output shaft, a single-row planetary gearset, a compound planetary gearset in front of which the single-row planetary gearset is disposed, gear-shifting members, a center support and a casing. The gear-shifting members comprise at least two brakes and a first, a second and a third clutch arranged between the single-row planetary gearset and the compound planetary gearset, and the brakes and clutches are disposed in such a manner that: the third clutch is disposed immediately behind the single-row planetary gearset; the first clutch is disposed at the outer side of the third clutch; the first brake is disposed behind the third clutch; the second clutch is disposed behind the first clutch and at the outer side of the first brake; and the second brake is disposed behind the second clutch and the first brake.

Preferably, the gear-shifting members further comprise a one-way clutch acting on the compound planetary gearset, and the one-way clutch is disposed at the inner side of the second brake and in front of the compound planetary gearset.

Preferably, the above-mentioned components are specifically connected with each other as follows.

The power input shaft is fixedly connected with an outer hub of the third clutch and a ring gear of the single-row planetary gearset, an inner hub of the third clutch is connected with a planetary gear carrier of the compound planetary gearset by means of a shaft, and the planetary gear carrier of the compound planetary gearset is connected with the shaft by means of a spline.

An outer hub of the first clutch is fixedly connected with an outer hub of the second clutch and is connected with a planetary gear carrier of the single-row planetary gearset, an inner hub of the first clutch is fixedly connected with a shaft of a rear sun gear of the compound planetary gearset, and the rear sun gear is connected with the shaft by means of a spline.

An inner hub of the second clutch and an outer hub of the first brake are respectively fixedly connected to a shaft of a front sun gear of the compound planetary gearset, and the front sun gear is connected with the shaft by means of a spline.

An inner hub of the first brake and an outer hub of the second brake are respectively fixedly connected with the center support and are located inside the center support, and the center support is connected to the casing of the transmission by means of a flat key, an inner hub of the second brake is fixedly connected with the planetary gear carrier of the compound planetary gearset.

The power output shaft is fixedly connected with a ring gear of the compound planetary gearset.

Preferably, an outer ring of the one-way clutch is connected with the inner hub of the second brake and the planetary gear carrier of the compound planetary gearset, and an inner ring of the one-way clutch is connected with the casing via the center support.

With the above structure, there is no clutch in front or at the outer side of the single-row planetary gearset and all the gear-shifting members are located between the single-row planetary gearset and compound planetary gearset. Such an arrangement makes the structure of transmission compact and shortens the route of power-transmitting. Therefore, the efficiency of power-transmitting of the transmission can be improved and fuel consumption of vehicle is lowered.

Since a one-way clutch is added in the preferred solution of the invention, the second brake does not be operated when shifting into the first gear, and only the first brake is required to be engaged (the release of the one-way clutch, no control is required) for accomplishing gear shifting when upshifting from the first gear to the second gear. As such, the number of gear shifting elements is reduced and gear shifting is easier to control, thereby the time for gear shifting is decreased.

BRIEF DESCRIPTION OF THE DRAWINGS

The invention will be described in further detail hereinafter with reference to accompanying drawings and particular embodiments.

DETAILED DESCRIPTION OF THE INVENTION

As shown in the figures, the automatic transmission for vehicle provided by the invention comprises the following main components: a power input shaft IP, a power output shaft OP, a single-row planetary gearset SP, a compound planetary gearset CP, five multiple-pieces friction type gear-shifting members (three clutches and two brakes), a one-way clutch OWC, a center support CS and a casing H of the transmission, etc. The power input shaft IP passes through the single-row planetary gearset SP and is coaxial therewith. The power output shaft OP is disposed behind the compound planetary gearset CP and is coaxial therewith.

As can be seen from the figures, in the transmission, the single-row planetary gearset SP is disposed in front of the compound planetary gearset CP and there is no clutch in front or at the outer side of the single-row planetary gearset SP. In addition, all the gear shifting components are located between the single-row planetary gearset and the compound planetary gearset. As compared to a prior-art arrangement (in which two clutches and two brakes are disposed between the two planetary gear sets, and another clutch is disposed in front of the single-row planetary gearset, or friction components of said another clutch is disposed at the outer side of single-row type planetary gear and an actuating component is arranged in front of the single-row planetary gearset), the arrangement in the invention makes the transmission more compact in structure and shortens the route of power transmitting.

Figure 1:
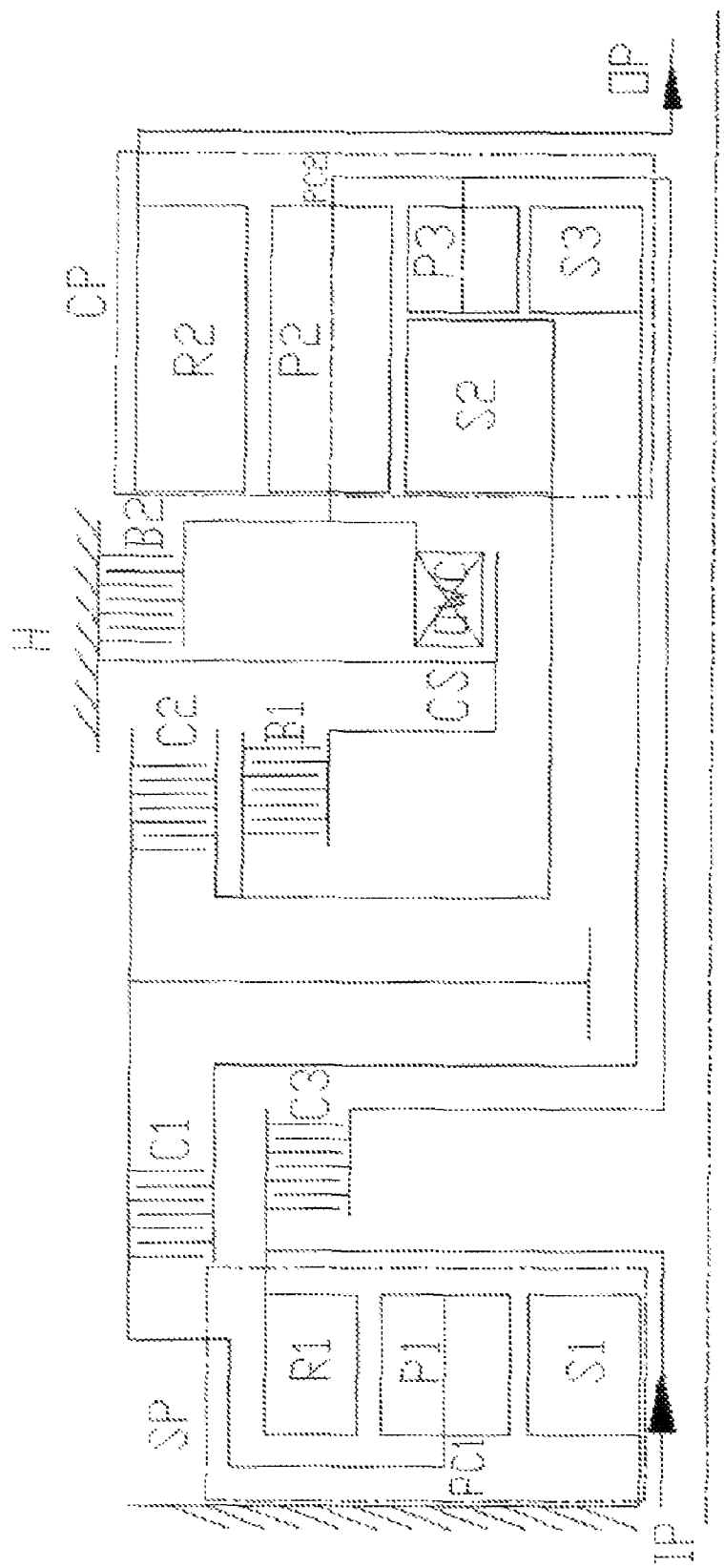
FIG. 1 is a schematic structural view of the invention.
Figure 2:
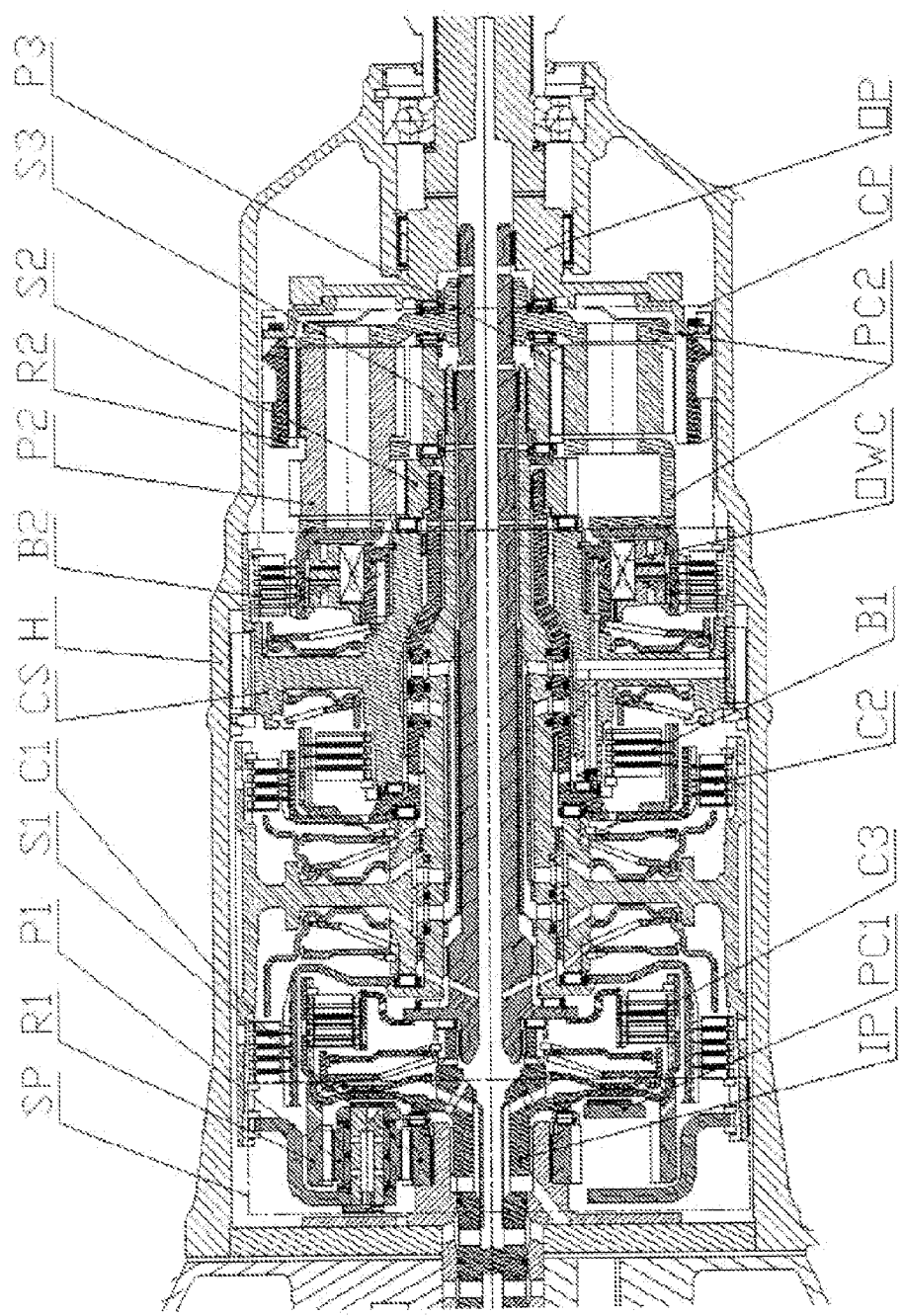
FIG. 2 is a sectional view of the structure of the invention.
IP: the power input shaft
OP: the power output shaft
H: the casing of the transmission
CS: the center support
SP: the single-row planetary gearset
S1: the sun gear of the single-row planetary gearset
P1: the planetary gear of the single-row planetary gearset
PC1: the planetary gear carrier of the single-row planetary gearset
R1: the ring gear of the single-row planetary gearset
C1: the first clutch
C2: the second clutch
C3: the third clutch
B1: the first brake
B2: the second brake
OWC: the one-way clutch
CP: the compound planetary gearset
S2: the sun gear of the compound planetary gearset
S3: the sun gear of the compound planetary gearset
P2: the long planetary gear of the compound planetary gearset
P3: the short planetary gear of the compound planetary gearset
PC2: the planetary gear carrier of the compound planetary gearset
R2: the ring gear of the compound planetary gearset.

FIGS. 1 and 2 show the arrangement of gear-shifting members of the transmission in accordance with the invention in a whole. Of course, there may be other possible arrangements in which all the gear-shifting members are located between the single-row planetary gearset and the compound planetary gearset.

As can be seen, a third clutch is directly driven by the power input shaft IP and is disposed immediately behind the single-row planetary gearset SP; a first clutch C1 is directly disposed at the outer side of the third clutch C3. The gear-shifting members also comprise two brakes. A first brake B1 is disposed behind the third clutch C3, and a second clutch C2 is located behind the first clutch C1 and at the outer side of the first brake B1. A second brake B2 is disposed behind the second clutch C2 and the first brake B1. Such an arrangement realizes that all the clutches are disposed between the single-row planetary gearset SP and the compound planetary gearset CP, thus this makes the transmission more compact in structure and shortens the route of power transmitting.

As shown in the figures, a one-way clutch OWC acting on the compound planetary gearset CP is disposed at the inner side of the second brake B2 and in front of the compound planetary gearset CP; namely, the second brake B2 is disposed at the outer side of the one-way clutch OWC.

When the transmission is shifted into the first gear, the first clutch C1 and the one-way clutch OWC of the gear-shifting members are operated. Power is input to the single-row planetary gearset SP from the power input shaft IP, then to the first clutch C1 via the planetary gear carrier PC1 of the single-row planetary gearset SP. The first clutch C1 inputs power to the compound planetary gearset CP. The planetary gear carrier PC2 of the compound planetary gearset CP is fixed due to a rapid response of the one-way clutch OWC. The power is output by the ring gear R2 of the compound planetary gearset CP via the power output shaft OP. Therefore, the second brake B2 does not be operated in the first gear, and an upshift from the first gear to the second gear can be realized as long as the first brake B1 is controlled to be engaged (the release of the one-way clutch OWC, and no control is required). As such, the number of gear-shifting elements is reduced and gear shifting is made easy to control, while the time for shifting is shortened. On the basis of inheriting the advantages of existing vehicle automatic transmission, the addition of the one-way clutch in the invention decreases the frequency of use of gear-shifting member for low speed gear and shortens the time for responding to gear shifting, thereby the purpose for improving power transmitting efficiency of transmission and driving performance of vehicle can be achieved, and it is possible to reduce fuel consumption.

FIG. 2 shows the specific structure of the invention. With reference to FIGS. 1 and 2, it can be seen that: a sun gear S1 of the single-row planetary gearset is stationary and the power input shaft IP is fixedly connected with an outer hub of the third clutch C3 and a ring gear R1 of the single-row planetary gearset; an inner hub of the third clutch C3 is connected with the planetary gear carrier PC2 of the compound planetary gearset CP by means of a shaft, and the planetary gear carrier PC2 of the compound planetary gearset CP is connected with the shaft by means of a spline; an outer hub of the first clutch C1 is integral with an outer hub of the second clutch C2 and is connected with the planetary gear carrier PC1 of the single-row planetary gearset SP; an inner hub of the first clutch C1 is fixedly connected with a shaft of a rear sun gear S3 of the compound planetary gearset CP, and the rear sun gear S3 is connected with the shaft by means of a spline; an inner hub of the second clutch C2 and an outer hub of the first brake B1 are fixedly connected to a shaft of a front sun gear S2 of the compound planetary gearset, and the front sun gear S2 is connected with the shaft by means of a spline; the inner hub of the first brake B1, the outer hub of the second brake B2 and the center support CS are integral, and the center support CS is fixed to the casing of the transmission by means of a flat key; an inner hub of the second brake B2, an outer ring of the one-way clutch OWC and the planetary gear carrier P2 of the compound planetary gearset CP are fixedly connected. An inner ring of the one-way clutch is connected with the casing via the center support CS; the power output shaft OP is fixedly connected with the ring gear R2 of the compound planetary gearset CP.

It is noted that, without limiting to the one-piece structure shown in the figures, the connection between the outer hub of the first clutch C1 and the outer hub of the second clutch C2 and the connection between the inner hub of the first brake B1, the outer hub of the second brake B2 and the center support CS may also take other forms of fixedly connecting. These other forms of connection are all within the scope of the protection of the invention as long as they meet the demands for use.

The invention claimed is:

1. A transmission, comprising a power input shaft, a power output shaft, a single-row planetary gearset, a compound planetary gearset in front of which the single-row planetary gearset is disposed, gear-shifting members, a center support and a casing,
wherein,
the gear-shifting members comprise at least two brakes and a first, a second and a third clutch arranged between the single-row planetary gearset and the compound planetary gearset, and the brakes and clutches are disposed in such a manner that:
the third clutch is disposed immediately behind the single-row planetary gearset;
the first clutch is disposed at an outer side of the third clutch;
the first brake is disposed behind the third clutch;
the second clutch is disposed behind the first clutch and at an outer side of the first brake; and
the second brake is disposed behind the second clutch and the first brake; and
wherein the components of the transmission are connected with each other in such a manner that:
the power input shaft is fixedly connected with an outer hub of the third clutch and a ring gear of the single-row planetary gearset, an inner hub of the third clutch is connected with a planetary gear carrier of the compound planetary gearset by means of a shaft, and the planetary gear carrier of the compound planetary gearset is connected with the shaft by means of a spline;
an outer hub of the first clutch is fixedly connected with an outer hub of the second clutch and is connected with a planetary gear carrier of the single-row planetary gearset, an inner hub of the first clutch is fixedly connected with a shaft of a rear sun gear of the compound planetary gearset, and the rear sun gear is connected with the shaft by means of a spline;
an inner hub of the second clutch and an outer hub of the first brake are respectively fixedly connected to a shaft of a front sun gear of the compound planetary gearset, and the front sun gear is connected with the shaft by means of a spline;
an inner hub of the first brake and an outer hub of the second brake are respectively fixedly connected with the center support and are located inside the center support, and the center support is connected to the casing of the transmission by means of a flat key, an inner hub of the second brake is fixedly connected with the planetary gear carrier of the compound planetary gearset; and
the power output shaft is fixedly connected with a ring gear of the compound planetary gearset.

2. A transmission according to claim 1, wherein the gear-shifting members further comprise a one-way clutch acting on the compound planetary gearset, and the one-way clutch is disposed at an inner side of the second brake and in front of the compound planetary gearset.

3. A transmission according to claim 2, wherein an outer ring of the one-way clutch is connected with the inner hub of the second brake and the planetary gear carrier of the compound planetary gearset, and an inner ring of the one-way clutch is connected with the casing via the center support.

* * * * *